Patented Nov. 9, 1948

2,453,608

UNITED STATES PATENT OFFICE 2,453,608

CELLULOSE ETHER COMPOSITIONS

Herbert J. West, Riverside, Conn., assignor to American Cyanamid Company, New York, N. Y., a corporation of Maine No Drawing. Application August 26, 1941, Serial No. 408,345

2 Claims. (Cl. 260—15)

This invention relates to the production of water-resistant materials from compositions containing water-soluble cellulose ethers, more particularly methyl cellulose.

The use of cellulose ethers, e. g., methyl cellulose, for protective and ornamental coatings on paper or the like has been limited by the water-solubility of the ethers. Attempts have been made to overcome this lack of resistance to water by mixing the ethers with various substances with generally indifferent success.

I have found that the water-soluble cellulose ethers are compatible with water-soluble alkyl ethers of dimethylol urea or methylated polymethylol melamine and compositions containing such substances admixed with the cellulose ether may be dried and cured to give a substantially water-insoluble product.

The following examples, in which parts are by weight, are given for purposes of illustration and not in limitation.

Example 1

A 5% solution of methyl cellulose is prepared by dissolving 70 parts thereof in 1330 parts of water. To this solution is added 20 parts of crystalline dimethyl ether of dimethylol urea. There is then added a saturated tartaric acid solution in an amount sufficient to give 1% of the acid based on the total solids in solution.

In order to determine quantitatively the water-resistant properties of this composition, weighed strips of glass cloth were coated by dipping the strips in the solution and then baked for 10 minutes at 250° F. Second and third coats were applied in the same manner. The strips of glass cloth carrying the cured coating were again weighed and immersed in distilled water at room temperature for intervals of 1, 8, and 24 hours, at which periods the strips were dried and reweighed. At the end of 1 hour, the strip retained 92% of its coating. At the end of 8 hours there was a retention of 87%, and 82% retention at the end of 24 hours. In a similar test using only a 5% solution of methyl cellulose the coating was completely dissolved at the end of 1 hour immersion.

Example 2

The procedure of Example 1 was duplicated except that 20 parts of the diethyl ether of dimethylol urea were used in place of the dimethyl ether of dimethylol urea. This composition was applied to glass cloth in the same manner and tested for water-solubility as before. At the end of 1 hour 97% of the coating was retained, at the end of 8 hours 92% was retained, and at the end of 24 hours 86% was retained.

Example 3

The procedure of Example 1 was repeated except that 20 parts of a water-soluble methylated hexamethylol melamine resin was used in place of the dimethyl ether of dimethylol urea. Coatings were tested as before with the result that after 1 hour immersion 90% was retained, at the end of 8 hours 85% was retained, and at the end of 24 hours 75% was retained.

The dimethyl ether of dimethylol urea and the diethyl ether of dimethylol urea may be prepared in any suitable manner but are preferably made in accordance with the process described in my application Serial No. 404,203 filed July 26, 1941, now Patent No. 2,397,825, April 2, 1946, of which the present application is in part a continuation. As described therein, the ethers are prepared by reacting dimethylol urea with the corresponding aliphatic alcohol at low temperatures and under specified acid conditions.

The methylated melamine resin may also be prepared by any suitable method but in order to obtain products having the desired degree of water-solubility, it is preferred to prepare them in general accordance with the specific methods referred to, using methylol melamine in place of methylol urea. By these methods there will be formed the corresponding methyl ethers of methylol melamine, analogous to the alkyl ethers of methylol urea.

In place of the methyl cellulose I may use other water-soluble cellulose ethers such as ethyl cellulose or the like. Applying my invention to such materials gives comparable results. Mixtures of the cellulose ethers may be used. Likewise mixtures of the insolubilizing compounds may be employed.

In place of the tartaric acid mentioned, I may use other suitable acid catalysts such as phosphoric acid or the various salts or esters which have acid properties or, under the conditions of curing, release acid or acid reacting material. The amount of acid catalyst used may be varied widely in accordance with the nature of the catalyst, the results desired, and the temperatures of curing which generally may range from about 120° F. to about 300° F. About 0.1% to about 5.0% of the acid catalyst, based on the total solids present in the composition, is sufficient for most purposes.

The ratio of the cellulose ethers to the ethers of dimethylol urea or of methylated methylol melamine may be varied over a wide range, the ratio of 4 to 1 being usually sufficiently to obtain the desired water insolubility.

The compositions prepared in accordance with the present invention may be utilized in practically any of the fields in which the cellulose ethers are customarily used. This is especially true for the production of water-resistant films and coatings. These coatings may be used for the protection or decoration of paper, textiles and the like. When applied to paper it is possible to protect the same against grease, oil and water and thereby make it suitable for use with food stuffs.

Furthermore our compositions may be used with suitable fillers to prepare molding compositions which may be consolidated by the use of heat and pressure. Sheets of paper or the like which have been treated with my compositions may be assembled in a suitable pile and consolidated by heat and pressure to give a laminated structure. Clear moldings may be made from my compositions without fillers by either casting or consolidating with pressure, utilizing temperatures sufficient to cure the composition. Likewise my compositions may be filmed out on suitable surfaces and cured, the films being removed to give transparent sheets of desired thicknesses. Such sheets may be utilized in the production of safety glass or the like.

Other suitable changes may be made in carrying out the process without departing from the spirit and scope thereof except as defined in the appended claims.

I claim:

1. A composition capable of being made relatively water-insoluble by heat, comprising an aqueous solution of about 4 parts of a water-soluble cellulose ether, about 1 part of a water-soluble methyl ether of polymethylol melamine, and an acidic hardening catalyst.

2. The process of rendering water-soluble ethers of cellulose substantially water-insoluble, which comprises preparing an aqueous solution of about 4 parts of a water-soluble cellulose ether with about 1 part of methyl ether of polymethylol melamine, and heating in the presence of an acidic hardening catalyst.

HERBERT J. WEST.

REFERENCES CITED

The following references are of record in the file of this patent:

UNITED STATES PATENTS

| Number | Name | Date |
|---|---|---|
| 2,161,805 | Dreyfus et al. | June 13, 1939 |
| 2,169,392 | Powers | Aug. 15, 1939 |
| 2,197,357 | Widmer | Apr. 16, 1940 |
| 2,254,001 | Conaway | Aug. 26, 1941 |
| 2,270,180 | Bass | Jan. 13, 1942 |
| 2,317,131 | Conaway | Apr. 20, 1943 |